3,298,109
AZEOTROPIC DRYING PROCESS
Byron B. Bohrer, Rosemont, Pa., assignor to Sun Oil Company, Philadelphia, Pa., a corporation of New Jersey
No Drawing. Filed Apr. 21, 1966, Ser. No. 544,106
7 Claims. (Cl. 34—5)

This application is a continuation-in-part of application, S.N. 394,065, filed September 2, 1964, now abandoned.

This invention relates to a process for drying materials suitable for human consumption, and more particularly, to a new method for azeotropically drying foodstuffs and other biologicals.

Freeze drying of materials for human consumption is known, wherein water is removed by sublimation of ice from frozen substances under vacuum, the temperature employed varying depending upon the composition of the material being dried. It is also known that freeze drying is possible without vacuum so long as the water vapor pressure of the medium surrounding a frozen specimen is below the vapor pressure of ice at that temperature. The substance thus dried may be stored for indefinite periods of time without decomposition or loss of activity. Azeotropic distillation is likewise known, the boiling point of the azeotropic mixture being constant, and below that of either constituent of the mixture. The volume composition of the azeotropic vapor depends upon the molecular weight and vapor pressures of the mixture components at a given temperature.

It is an object of this invention to provide an improvement in the process of drying materials suitable for human consumption. It is another object to provide an inexpensive and simple process for preserving foodstuffs.

These and other objects are achieved by the process of this invention. The process comprises contacting an unfrozen or frozen material or foodstuffs with an agent which will form an azeotrope with water, adjusting pressure and temperature to levels at which an azeotropic mixture of water and the agent will boil, continuously boiling the resulting mixture until the material is dehydrated and recovering the essentially dehydrated material from the agent.

The azeotrope-forming agent (hereinafter also called the azeotrope), must be readily biologically degradable and both it and its decomposition product must be harmless to humans. These properties are important since it is within the scope of this invention to apply the process to materials which will be later consumed, and residual azeotropes in the material, if not harmless, could pose a danger to the consuming host.

In addition, the azeotropes contemplated by this invention should, at atmospheric pressure, boil near or below the boiling point of water (below about 103° C. with low points preferred), and should have at least a partial miscibility with water. The low boiling nature of the agent allows the process to be conducted at temperatures which will not harm the biological treated and allows easy removal of the agent after drying is completed. Miscibility with water appears to enable the process to be adapted to the drying of large chunks or complete specimens of foodstuff. For example, chunks of meat, complete strawberries and slices of potatoes may be dehydrated.

Agents which are suitable in the invention include n-propyl alcohol, n-propyl acetate, ethyl alcohol and ethyl acetate. Ethyl alcohol and ethyl acetate are the preferred agents. Ethyl amine, diethyl ether and dioxane are among the unsuitable agents since residual amounts of these may be harmful to a host. Toluene is unsuitable since, in residual amounts, it may cause poisoning and furthermore has a relatively high boiling making recovery of the biological from the agent difficult.

The process of this invention may be carried out on either frozen or unfrozen samples. If the procedure is an azeotropic freeze drying, the material which is to be dried, generally foods such as meat, vegetables, and fruit, or biological serums and the like, is first frozen by a usual method employed for freezing these substances. Such methods include spraying with liquid nitrogen and application of cold air blasts. The frozen material is then placed in a vessel containing the agent and the vessel is attached to a vacuum source through a condenser. A vacuum is applied and the vessel is heated to a temperature sufficient to cause the azeotrope to distill. Under these conditions the azeotrope is rapidly formed and removed, leaving the dehydrated substance in the azeotropic agent. Removal of the agent from the dehydrated material is then conveniently achieved by drying in an oven which may be a vacuum oven. Undue heating is avoided since it may degrade the sample.

The boiling point of the azeotrope used can vary considerably depending upon the amount of vacuum employed. Thus, for example, with water vapor-ethyl acetate, at 760 mm. Hg, the boiling point of the azeotrope is about 89° C., at 250 mm. it is 42.6° C., while at 25 mm. Hg it is −19° C. With water vapor-ethyl alcohol, the boiling point is 78.2° C. at 760 mm. Hg.

The amount of the azeotrope employed will also vary, depending upon the particle size of the material. It has been found that best results are achieved with ethyl acetate in an initial ratio of about 15 cc. of azeotrope forming agent per 1 gm. of material and with ethyl alcohol in a ratio of about 30 cc. of agent per 1 gm. of material. The amount of agent used is not critical as long as an excess is present over that needed to form the azeotrope. Additional quantities may be added as drying progresses.

If azeotropic freeze drying is desired, the process may be carried out with ethyl acetate under vacuum at a temperature, for example, of about 24° C. At a pressure of 100 mm. Hg, the boiling of an ethyl acetate-water azeotrope mixture will be at about 23° C., making it possible to maintain the material to be dried in its frozen state. Best results are achieved by maintaining the material frozen due to the fact that the heat applied to the container holding the frozen material and ethyl acetate causes rapid sublimation of the ice before it can melt. The latent heat of sublimation is quite large and the water vapors carried off by the azeotrope act as a refrigerant during their vaporization from the ice. Moreover, the resulting vapor pressure of the azeotrope, being lower than that of the surrounding ethyl acetate, causes rapid boiling, and because the temperature in the container is higher than that of the cooled condenser, the azeotrope is easily and rapidly removed under the vacuum. Removal of water vapor from the surface of the material to be dried is further facilitated by the reduction of water vapor pressure at the surface of the frozen specimen.

Drying without prefreezing the sample is carried out analogously to the procedure described above for freeze drying. In either case, the procedure is terminated when the sample has been dried to a desired degree, or, if complete drying is desired, when no additional vapor is given off under constant temperature conditions. The dehydrated material can then be removed and heated in an oven to dry off the remaining azeotrope. The material may then be stored away at room temperature preferably in a nitrogen-filled, sealed container for reconstitution with water at a later date.

The following examples illustrate the invention:

Example I

Approximately 200 ml. of ethyl acetate were placed in a 700 ml. round bottom vessel and heated to 24° C. The vessel was fitted with an insulated vacuum distillation receiver and a condenser, a manometer, a vacuum control, and vacuum line. A sphere of hamburger, about ¾ inch in diameter, was immersed in liquid propane for fifteen minutes until frozen and then placed in the vessel. The pressure was reduced to 100 mm. Hg whereupon the contents of the vessel surrounding the meat sample came to a vigorous boil with the bulk of bubbles forming at the surface of the meat.

Boiling was continued for about one hour with addition of agent as needed. At the end of this time, the vacuum was broken and the sample withdrawn and placed in a vacuum oven for about an hour.

After drying in the oven, the sample had the porous structure of dried meat and had only a slight odor of ethyl acetate. Upon adding water, the material promptly rehydrated to the consistency, appearance, and taste of raw uncooked meat.

Another portion of the dried meat was stored in a weighing bottle for about eight weeks. Water was added to this sample and it rehydrated to raw hamburger indistinguishable from fresh meat.

Example II

The procedure of Example I was repeated using a molded pellet of unfrozen hamburger approximately ½ inch in diameter. Boiling was continued on the sample for about two hours. At the end of this time, the sample was placed in a vacuum oven for one hour. The dried sample was indistinguishable from that of Example I and was readily rehydratable to raw hamburger even after a storage time of four or five weeks.

Example III

One whole strawberry and two half strawberries, including stem and leaves, were frozen in liquid propane. The frozen samples were placed in the round bottom vessel, a vacuum pulled to 100 mm. and 500 ml. of ethanol added. The vacuum was then reduced to 59 mm. Hg pressure and the temperature, to 22° C. Boiling was continued for about 1½ hours at these conditions at which time the vacuum was broken, the alcohol poured off and the berries removed and placed in the vacuum oven for 45 minutes. The dried berries, at the end of this time, appeared soft and porous and exhibited a strawberry-like aroma. Berries, stems and leaves retained their original color. The berries upon rehydration appeared and tasted like fresh berries with only a slight taste of ethanol.

Example IV

The procedure of Example III was repeated using ethyl alcohol as the azeotropic agent and sliced raw potatoes as the material dried. The potatoes were shrunken and appreciably dried, whitish, with good skin color, porous, with no alcohol odor. The slices readily rehydrated to their original form and taste.

Various other agents and biologicals were used in the procedure. A summary of all runs and results is given in the following table:

| Sample | Azeotropic Agent | Pressure (mm. Hg) | Temperature (° C.) | Period of Drying (hr.) | Results |
|---|---|---|---|---|---|
| I—Frozen Hamburger | Ethyl acetate | 100 | 24 | 1 | Dried with little loss in color or odor or change in appearance—readily rehydratable. |
| II—Unfrozen Hamburger | do | 100 | 24 | 2 | Do. |
| III—Frozen Strawberries | Ethyl alcohol | 59 | 22 | 1½ | Dried with little or no loss in color, odor or appearance—readily rehydratable. |
| IV—Unfrozen Potatoes | do | 59 | 22 | ¾ | Do. |
| V—Unfrozen Potatoes | Cyclohexane | 105 | 24 | 2 | No drying. |
| VI—Unfrozen Potatoes | Butyl acetate | 40–37 | 25 to 29 | 1 | Do. |
| VII—Unfrozen Potatoes | n-Hexyl alcohol | 37 | 61½ to 66 | 1½ | Little drying—hard cellular structure. |
| VIII—Unfrozen Apple Slices | Ethyl acetate | Atmospheric | 77 | 1½ | Dried with little or no loss in color or odor or change in appearance—readily rehydratable. |
| IX—Frozen Apple Slices | do | Atmospheric | 77 | 1½ | Do. |
| X—Frozen Banana | do | 100 | 24 | 1½ | Do. |
| XI—Unfrozen Potatoes | do | 100 | 24 | 1½ | Do. |

It is thought that some miscibility with water is required in the agent to successfully azeotropically dry large or whole samples. For example, as illustrated in the table, attempts to azeotropically dry a sample using cyclohexane were unsuccessful.

In addition to some miscibility with water, the process of this invention requires the liquid agent to be relatively low boiling and readily degradable. Both the azeotrope and its decomposition products should be harmless to humans.

What is claimed is:

1. A process for azeotropically drying materials which comprises
   (a) contacting said materials with a harmless and biologically degradable azeotropic agent which is miscible with water and which boils below about 103° C.,
   (b) adjusting the pressure and temperature to levels at which an azeotropic mixture of water and the agent will boil,
   (c) continuously boiling the resulting azeotropic mixture until the material is dehydrated, and
   (d) recovering the essentially dehydrated material from the agent.

2. The process of claim 1 wherein the material is in the frozen state when contacted with the agent.

3. The process of claim 1 wherein the material is in the unfrozen state when contacted with the agent.

4. The process of claim 1 wherein the agent is selected from the group consisting of ethyl acetate and ethyl alcohol.

5. A process for azeotropically drying foodstuffs which comprises
   (a) contacting a foodstuff with an agent selected from the group consisting of ethyl acetate and ethyl alcohol, (b) adjusting the temperature and pressure of the foodstuff and agent to a level at which a resulting azeotropic mixture of the agent and water will boil,
(c) continuously removing said azeotrope until the foodstuff is dehydrated, and
(d) recovering the dehydrated foodstuff from the agent.

6. The process of claim 5 wherein the foodstuff is contacted in its frozen state and the temperature and pressure level are adjusted to levels sufficient to cause the ice contained in the foodstuff to sublime directly to its vapor state.

7. The process of claim 5 wherein the foodstuff is contacted in its unfrozen state.

References Cited by the Examiner

UNITED STATES PATENTS

| 1,687,588 | 10/1928 | Pearson | 34—9 |
| 2,374,455 | 4/1945 | Porche | 34—5 |
| 2,659,986 | 11/1953 | Hink | 34—5 |
| 2,853,797 | 9/1958 | Graham | 34—5 |
| 2,917,833 | 12/1959 | Kremen | 34—9 |
| 3,031,312 | 4/1962 | Morgan | 99—204 |

OTHER REFERENCES

"Azeotropic Freeze Drying," by Wistreich et al., Science, vol. 138, p. 138, October 12, 1962.

WILLIAM J. WYE, *Primary Examiner.*